United States Patent [19]

Lingenfelter et al.

[11] Patent Number: 5,245,640
[45] Date of Patent: Sep. 14, 1993

[54] NUCLEAR FUEL ROD END PLUG PRESSURIZATION HOLE INSPECTION APPARATUS

[75] Inventors: Andrew A. Lingenfelter; Jaime A. Zuloaga, Jr., both of Wilmington; David G. Smith; Johnny R. Skipper, both of Leland, all of N.C.

[73] Assignee: General Electric Company, San Jose, Calif.

[21] Appl. No.: 889,943

[22] Filed: Jun. 2, 1992

[51] Int. Cl.$^5$ .............................................. G21C 17/00
[52] U.S. Cl. ...................................... 376/245; 376/246; 376/247; 376/451; 73/37; 73/37.5; 73/49.8; 73/861.58
[58] Field of Search ............... 376/245, 246, 247, 250, 376/251, 451; 138/90; 73/861.58, 49.8, 37, 37.5

[56] References Cited

U.S. PATENT DOCUMENTS

| | | | |
|---|---|---|---|
| 1,884,042 | 10/1932 | Marlin | 73/37 |
| 2,266,566 | 12/1941 | Poole | 73/51 |
| 2,718,140 | 9/1955 | Aller | 73/37.5 |
| 3,618,364 | 11/1971 | Hawkes | 73/37 |
| 3,681,974 | 8/1972 | McLellan et al. | 73/37.5 |
| 3,946,595 | 3/1976 | Carlson | 73/37 |
| 4,075,454 | 2/1978 | Duncan et al. | 219/137 R |
| 4,103,534 | 8/1978 | Hoof | 73/37 |
| 4,382,379 | 5/1983 | Kelly | 73/46 |
| 4,407,171 | 10/1983 | Hasha et al. | 73/46 |
| 4,430,886 | 2/1984 | Rood | 73/37 |
| 4,698,999 | 10/1987 | Trick et al. | 73/49.8 |
| 4,764,332 | 8/1988 | Guina | 376/203 |
| 5,010,224 | 4/1991 | Shirey et al. | 219/69.17 |

FOREIGN PATENT DOCUMENTS

| | | | |
|---|---|---|---|
| 108186 | 8/1979 | Japan | 376/451 |
| 1212795 | 9/1986 | Japan | 376/245 |
| 1-262433 | 10/1989 | Japan | 73/37 |

Primary Examiner—Donald P. Walsh
Assistant Examiner—Chrisman D. Carroll
Attorney, Agent, or Firm—John S. Beulick

[57] ABSTRACT

To inspect the integrity of pressurization holes in nuclear fuel rod final end plugs, quality assurance apparatus includes an adapter providing a test chamber into which an end plug is inserted. Instrument gas is introduced into the test chamber through an inlet port for flow to the atmosphere through the pressurization hole. A mass flow meter measures the gas flow through the pressurization hole to determine if it is capable of supporting requisite pressurization of a nuclear fuel rod when the end plug is assembled thereto.

3 Claims, 1 Drawing Sheet

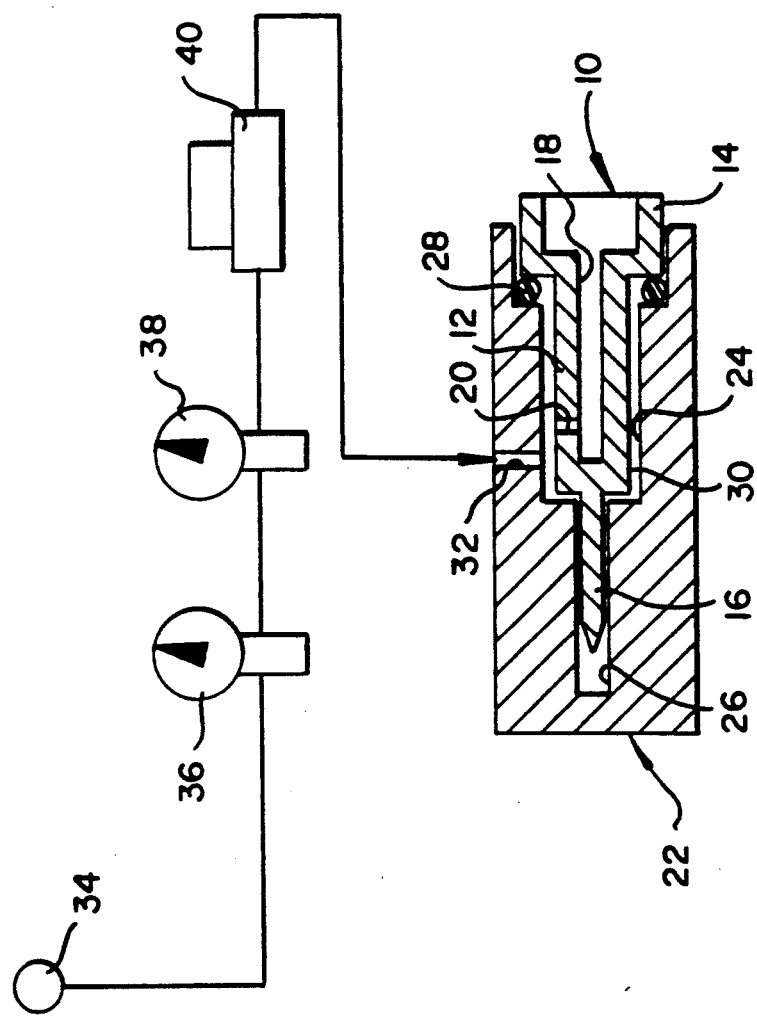

NUCLEAR FUEL ROD END PLUG PRESSURIZATION HOLE INSPECTION APPARATUS

The present invention relates to nuclear fuel rod manufacture and particularly to quality assurance inspection of end plugs providing the final closure for fuel-loaded rods.

BACKGROUND OF THE INVENTION

The manufacture of nuclear fuel rods starts with a cladding tube of a suitable zirconium alloy. A first end plug is girth welded to one end of the cladding tube and then is loaded with a column of fuel pellets. The loaded cladding tube is taken to a welding station where a final end-plug is welded to the other cladding tube end under an atmosphere of inert gas, such as argon. The final end plug is provided with a small pressurization hole through which the interior of the cladding tube is evacuated and then backfilled with an appropriate pressurizing gas, such as helium. It then remains to seal this pressurizing hole, which is typically accomplished by welding it closed. The final end plug girth and weld is then ultrasonically inspected for integrity.

One of the many concerns in nuclear fuel rod manufacture is that the fuel rods are pressurized to manufacturing specifications. Improper pressurization can degrade heat transfer characteristics and thus reduce in-reactor performance. A major factor in achieving proper fuel rod pressurization is the integrity of the end plug pressurization hole. If this hole is undersized or occluded in any way, proper pressurization will not be achieved. Once the pressurization hole is sealed, the fuel rod internal pressure can not be readily checked for quality assurance.

SUMMARY OF THE INVENTION

It is accordingly an objective of the present invention to provide quality assurance apparatus for verifying the integrity of the pressurization hole in a final end plug prior to the final end plug weld closing off the remaining open end of a loaded cladding tube. To this end, the apparatus includes a fluidic circuit comprising a mass flow meter and an end plug test adapter. The adapter includes a transverse port opening into a cylindrical test chamber into which a final end plug is sealingly inserted. Instrument gas from a source flows through the mass flow meter and transverse port into the test chamber and out to the atmosphere through the end plug pressurization hole. The gas flow through the end plug pressurization hole is registered by the mass flow meter to provide an indication of whether or not the pressurization hole will ultimately accommodate proper nuclear fuel rod pressurization.

The invention according comprises the features of construction, combination of elements and arrangement of parts, all as described hereinafter, as the scope of the invention will be indicated in the claims.

BRIEF DESCRIPTION OF THE DRAWING

For a full understanding of the nature and objectives of the present invention, reference may be had to the following Detailed Description taken in connection with the accompanying drawing, in which the sole figure is a schematic diagram of a nuclear fuel rod end plug pressurization hole inspection apparatus constructed in accordance with the present invention.

DETAILED DESCRIPTION OF THE DRAWING

The apparatus of the present invention is devoted to quality assurance inspection of final end plugs utilized in the manufacture of nuclear fuel rods. A typical final end plug, generally indicated at 10, is comprised of cylindrical body 12 having an enlarged diameter base 14 at one end and a reduced diameter, axially elongated tip 16 at its other end. A blind, countersunk axial bore 18 is machined through bore 14 into body 12. A radial pressurization hole 20 is drilled through body 12 to intersect with bore 18. The specific objective of the present invention to conduct a quality assurance inspection of pressurization hole 20.

Thus, the present invention provides a test adapter, generally indicated at 22, which is machined to provide a cylindrical test chamber 24 into which a final end plug 10 is inserted. A pick and place mechanism (not shown) may be implemented to take successive end plugs from an input, such as a vibratory feeder (not shown), insert each end plug into the test chamber, and then remove each tested end plug to an output chute where they are sorted into accept and reject lots, depending on test results. The test chamber is terminated by a blind hole 26 dimensioned to freely accepted tip 16 upon end plug insertion, while the entry into the test chamber is of enlarged diameter to freely accept end plug base 14. An O-ring seal 28 is disposed between the end plug base and the shouldered test chamber entry to seal off from the atmosphere an annular cavity 30 defined between the test chamber and end plug body peripheries. Completing the description of the test adapter, a transverse inlet port 32 is drilled through the test adapter wall into open communication with the test chamber.

To test the integrity of the pressurization hole 20 in an end plug inserted into test chamber 24, a pressurized source 34 of instrument gas, such as nitrogen, is fed through a pressure regulator 36, a pressure gauge 38, a mass flow meter 40 and test adapter port 32 into cavity 30. Since this cavity is sealed by O-ring seal 28, the gas must flow through pressurization hole 20 into end plug bore 18 and exhaust to the atmosphere. The gas pressure is set by the pressure regulator to within a range of 3 to 5 p.s.i.g., which is indicated by gauge 36, prior to end plug insertion. After end plug insertion, a brief interval is allotted to allow gas flow to stabilize, since the pressurization hole is typically quite small in diameter, e.g. on the order of 32 mils. A reading of the mass flow meter is then taken to determine if the pressurization hole has the requisite integrity to support fuel rod pressurization consistent with manufacturing specifications. The end plug is then removed from the test adapter and put into either an accept or reject container depending on the flow meter reading.

In order that the angular location of the pressurization hole in the test chamber does not affect mass flow meter readings, it has been determined that the inner diameter of the test chamber should be at least 25% greater and preferably 33% greater than the outer diameter of the end plug body. The cross section of annular cavity 30 is then sufficiently large to provide an effective plenum to permit end plugs insertion without regard to the angular relationship of their pressurization holes to the larger inlet port 32. This feature significantly reduces the complexity and expense of a pick and place mechanism implemented to automate the pressurization hole quality assurance inspection procedure.

In view of the foregoing, it is seen that the objectives set forth above are efficiently attained, and, since certain changes may be made in the construction set forth without departing from the scope of the invention, it is intended that matters of detail be taken as illustrative and not in a limiting sense.

Having described the invention, what is claimed as new and desired to secure by Letters Patent is:

1. Quality assurance apparatus for inspecting pressurization holes in final end plugs for nuclear fuel rods, each final end plug includes a cylindrical body having a blind axial bore therein, and the pressurization hole extends radially through the body into communication with the bore, said apparatus comprising, in combination:

A. an adapter having a test chamber into which a final end plug is inserted and a transverse inlet port communicating with said test chamber; said test chamber being of a cylindrical shape and having an inner diameter at least 25% greater than the outer diameter of the end plug body to provide an annular cavity therebetween of sufficient size such that inspection is not affected by the angular location of the pressurization hole relative to said inlet port, said adapter further including an annular seal disposed to seal said annular cavity from the atmosphere;

B. a source introducing an instrument gas into said test chamber through said inlet port for flow to the atmosphere through the pressurization hole of an inserted end plug; and C. a mass flow meter for measuring the flow of instrument gas through the pressurization hole to determine if the pressurization hole will support requisite pressurization of a nuclear fuel rod after the end plug has been welded thereto.

2. The quality assurance apparatus defined in claim 1, wherein said test chamber inner diameter is at least 33% greater than the end plug body outer diameter.

3. The quality assurance apparatus defined in claim 1, which further includes a pressure regulator and a pressure gauge connected in serial gas flow relation between said source and said mass flow meter.

* * * * *